United States Patent
Wang et al.

(10) Patent No.: US 10,957,053 B2
(45) Date of Patent: Mar. 23, 2021

(54) MULTI-OBJECT TRACKING USING ONLINE METRIC LEARNING WITH LONG SHORT-TERM MEMORY

(71) Applicant: DeepNorth Inc., Foster City, CA (US)

(72) Inventors: Jinjun Wang, San Jose, CA (US); Xingyu Wan, Xi'an (CN)

(73) Assignee: DEEPNORTH INC., Foster City, CA (US)

( * ) Notice: Subject to any disclaimer, the term of this patent is extended or adjusted under 35 U.S.C. 154(b) by 166 days.

(21) Appl. No.: 16/164,587

(22) Filed: Oct. 18, 2018

(65) Prior Publication Data
US 2020/0126241 A1  Apr. 23, 2020

(51) Int. Cl.
*G06T 7/262* (2017.01)
*G06N 3/04* (2006.01)
*G06T 7/246* (2017.01)

(52) U.S. Cl.
CPC ........... *G06T 7/262* (2017.01); *G06N 3/0454* (2013.01); *G06N 3/0481* (2013.01); *G06T 7/251* (2017.01)

(58) Field of Classification Search
CPC .... G06N 3/0454; G06N 3/0481; G06T 7/251; G06T 7/262
See application file for complete search history.

(56) References Cited

PUBLICATIONS

Zhu, Ji, et al. "Online multi-object tracking with dual matching attention networks." Proceedings of the European Conference on Computer Vision (ECCV). 2018. (Year: 2018).*

Chung, Dahjung, Khalid Tahboub, and Edward J. Delp. "A two stream siamese convolutional neural network for person re-identification." Proceedings of the IEEE International Conference on Computer Vision. 2017. (Year: 2017).*

Wan, Xingyu, et al. "Multi-object tracking using online metric learning with long short-term memory." 2018 25th IEEE International Conference on Image Processing (ICIP). IEEE, 2018. (Year: 2018).*

Yan, Yichao, et al. "Person re-identification via recurrent feature aggregation." European Conference on Computer Vision. Springer, Cham, 2016. (Year: 2016).*

Wei, Longhui, et al. "Glad: Global-local-alignment descriptor for pedestrian retrieval." Proceedings of the 25th ACM international conference on Multimedia. 2017. (Year: 2017).*

* cited by examiner

*Primary Examiner* — Nirav G Patel
(74) *Attorney, Agent, or Firm* — David R. Stevens; Stevens Law Group

(57) ABSTRACT

A multi-object tracking (MOT) framework uses a dual Long Short-Term Memory (LSTM) network (Siamese) for MOT. The dual LSTM network learns metrics along with an online updating scheme for data association. The dual LSTM network fuses relevant features of trajectories to interpret both temporal and spatial components non-linearly and concurrently outputs a similarity score. An LSTM model can be initialized for each trajectory and the metric updated in an online fashion during the tracking phase. An efficient and feasible visual tracking approach using Optical Flow and affine transformations can generate robust tracklets for initialization. Thus, the MOT framework can achieve increased tracking accuracy. Further, the MOT framework has improved performance and can be flexible utilized in arbitrary scenarios.

9 Claims, 3 Drawing Sheets

MULTI-OBJECT TRACKING USING ONLINE METRIC LEARNING WITH LONG SHORT-TERM MEMORY

TECHNICAL FIELD

The present disclosure relates generally to a system capable of tracking multiple objects seen in video surveillance systems. The system can use metric learning with long short-term memory to track multiple objects.

BACKGROUND

Multi-object tracking (MOT) of targets from security cameras is a challenging problem. Targets must be identified, trajectories determined, and target identity maintained over time. One challenge of MOT is to continuously and effectively model the vast variety of object appearances with uncertainty in arbitrary scenarios, caused by occlusions, illumination variations, motion blur, false alarm and miss detections, variations of targets numbers, etc.

Some MOT techniques utilize pre-trained models on a large-scale dataset to obtain richer feature representations based on convolutional neural networks (CNNs). However, these techniques, which typically lack sufficient training data and rely on appearance feature, leave many tracking issues unsolved.

"Tracking-by-detection" frameworks represent the detection results of objects as bounding boxes and are available in a video sequence as prior information. The "Tracking-by-detection" paradigm uses traditional data association techniques including the Multiple Hypothesis Tracker (MHT) and the Joint Probabilistic Data Association Filter (JPDAF) to solve the MOT problem. As such, these traditional data association techniques establish sophisticated models to capture the combinatorial complexity on a frame-by-frame basis.

More recently, CNN-based feature representations for MOT have been adopted. These CNN-based feature representations determine people appearance along with computation of the affinity between two measurements. However, CNN-based feature representations rely on appearance features, which can be problematic since people with similar appearances are not necessarily identical.

Further, some trackers model different features of objects in a scene by incorporating a myriad of components such as motion, appearance, scale, etc. For example, trackers can try to learn an end-to-end representation for state estimation utilizing recurrent neural networks (RNNs). An RNN-based approach can be utilized to learn complex models in realistic environments.

SUMMARY

In one aspect, a multi-object tracking (MOT) framework uses a dual Long Short-Term Memory (LSTM) network (Siamese) for MOT. The dual LSTM-network learns metrics along with an online updating scheme for data association. The dual LSTM network fuses relevant features of trajectories to interpret both temporal and spatial components non-linearly and concurrently outputs a similarity score.

An LSTM model can be initialized for each trajectory and the metric updated in an online fashion during the tracking phase. An efficient and feasible visual tracking approach using Optical Flow and affine transformations can generate robust tracklets for initialization. Thus, the MOT framework can achieve increased tracking accuracy. Further, the MOT framework has improved performance and can be flexible utilized in arbitrary scenarios.

DETAILED DESCRIPTION

Aspects of the invention use online metric learning and long short-term memory (LSTM) units for multi-object tracking (MOT). Multiple features are fused into a metric learning LSTM network for learning temporal and spatial features and outputting a similarity score for a data association. An online method is used to establish a discriminative trajectory model for each object. The approach has competitive tracking accuracy and is flexibly applicable to arbitrary scenarios.

Long short-term memory (LSTM) units (or blocks) are a building unit for layers of a recurrent neural network (RNN). A RNN including LSTM units may be referred to as an LSTM network. A LSTM unit cam be composed of a cell, an input gate, an output gate and a forget gate. The cell is responsible for "remembering" values over arbitrary time intervals (thus the word "memory" in LSTM). Each of the three gates can be thought of as a "conventional" artificial neuron, for example, in a multi-layer (or feedforward) neural network. That is, each gate computes an activation (e.g., using an activation function) of a weighted sum. The gates can be viewed as regulators of the flow of values that goes through the connections of the LSTM (thus the denotation "gate"). There are connections between these gates and the cell.

The expression long short-term refers to the fact that LSTM is a model for the short-term memory which can last for a long period of time. LSTMs can classify, process and predict time series given time lags of unknown size and duration between important events. Relative insensitivity to gap length gives LSTMs advantages over alternative RNNs, hidden Markov models and other sequence learning methods in numerous applications.

Siamese neural network is a class of neural network architectures that contain two or more subnetworks having essentially the same configuration with the same parameters and weights. Parameter updating is mirrored across both subnetworks. Generally, two essentially identical subnetworks are used to process two inputs and another module processes the outputs of the essentially identical subnetworks to produce a final output.

A Siamese LSTM network is an example of a Siamese neural network.

Figure 1:
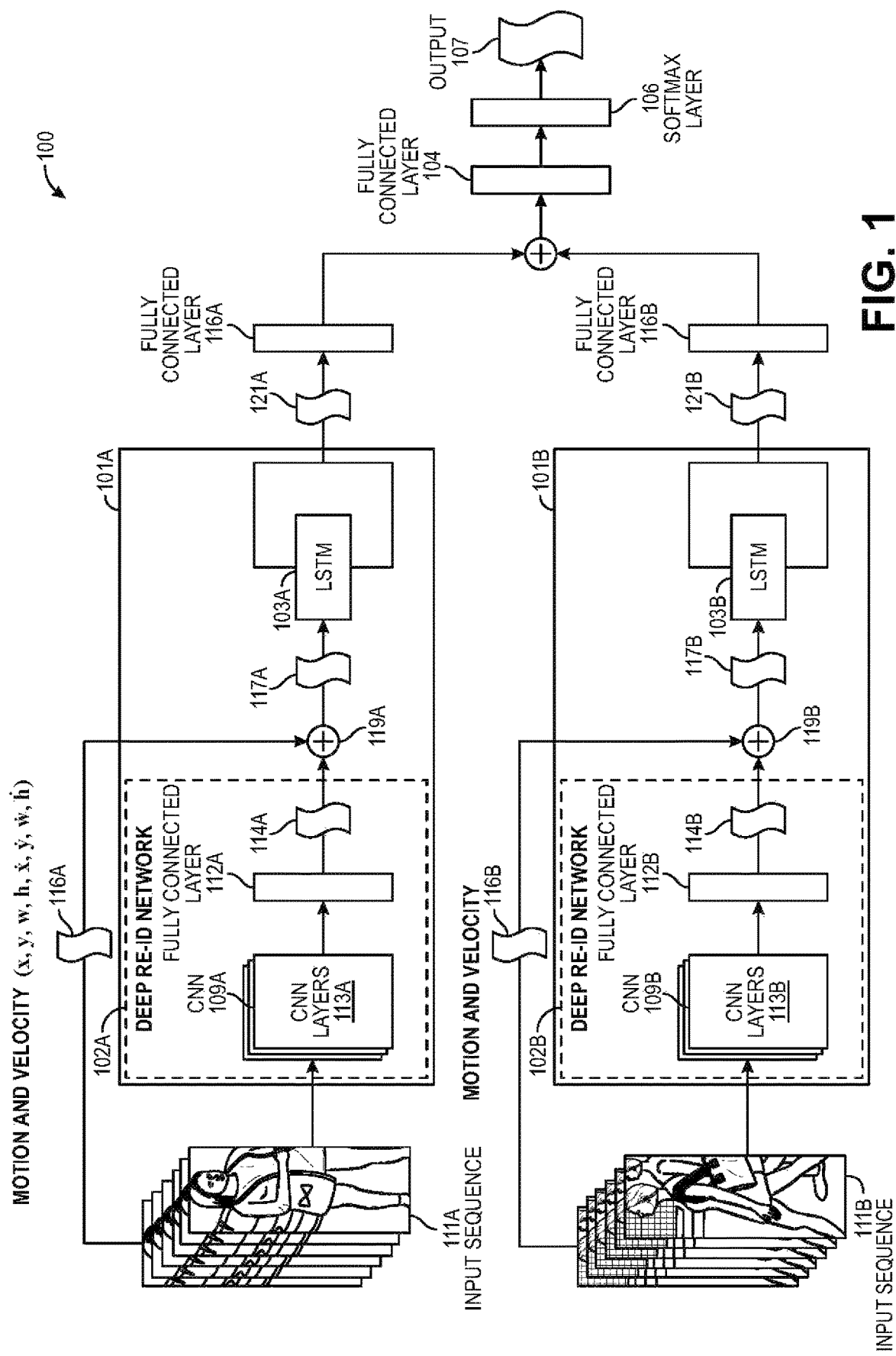
FIG. 1 illustrates an example neural network architecture for multi-object tracking using online metric learning and long short-term memory.

FIG. 1 illustrates an example neural network architecture 100 for multi-object tracking using online metric learning and long short-term memory. Neural network architecture 100 can include both a metric learning component and a similarity computation component. As depicted, neural network architecture 100 includes network 101A, network 101B, fully connected layer 112A, fully connected layer 112B, fully connected layer 104, softmax layer 106, and output 107.

For metric learning, the pair of networks 101A and 101B (Siamese) each includes a deep re-id network and a long short-term memory (LSTM) layer. Each deep re-id network includes a convolutional neural network (CNN) and a fully connected layer. For example, network 101A includes deep re-id network 102A and LSTM layer 103A. Deep re-id network 102A further includes CNN 109A, including CNN layers 111A 113A, and fully connected layer 112A. Similarly, network 101B includes deep re-id network 102B and LSTM layer 103B. Deep re-id network 102B further includes CNN 109B, including CNN layers 113B, and fully connected layer 112B.

Figure 2:
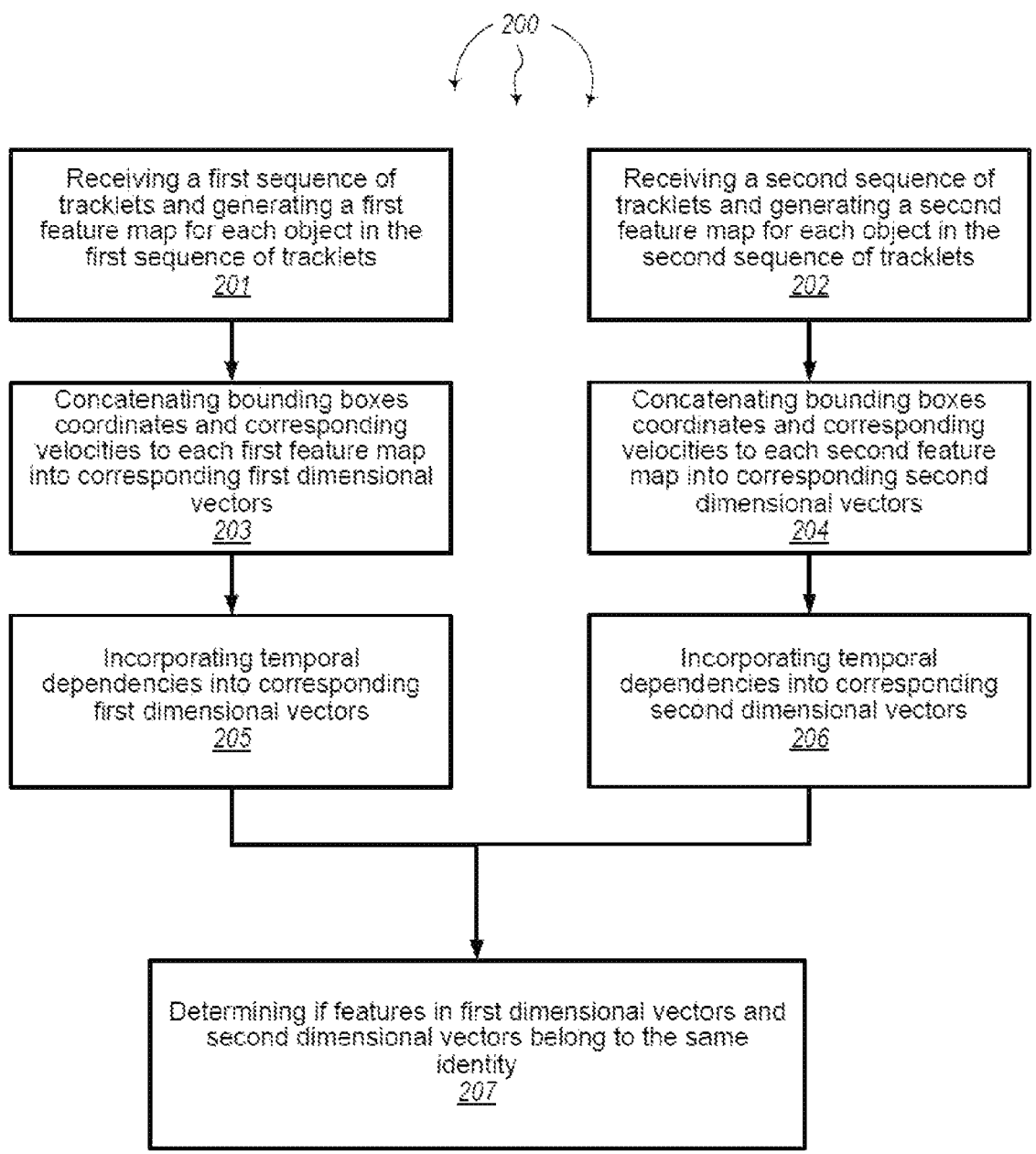
FIG. 2 illustrates a flow chart of an example method for multi-object tracking using online metric learning and long short-term memory.

FIG. 2 illustrates a flow chart of an example method 200 for multi-object tracking using online metric learning and long short-term memory. Method 200 will be described with respect to the components in neural network architecture 100.

Generally, at least three different features are integrated into each of network 101A and network 101B for learning. A first feature can include pre-training CNN 109A and CNN 109B on a person re-identification data set (e.g., CUHK03) to extract a feature map of each object (e.g., a specified number (e.g., 800) dimensional appearance features).

Method 200 includes receiving a first sequence of tracklets and generating a first feature map for each object in the first sequence of tracklets (201). For example, network 101A receives input sequence 111A of tracklets. Deep re-id network 102A generates an 800-dimensional feature of each object. More specifically, CNN 109A receives input sequence 111A of tracklets and outputs to fully connected layer 112A to generate an 800-dimensional feature map (e.g., a feature map 114A) of each object (and that can be sent to 119A).

Method 200 includes receiving a second sequence of tracklets and generating a second feature map for each object in the second sequence of tracklets (202). Similarly, network 101B receives input sequence 111B of tracklets. Deep re-id network 102B generates an 800-dimensional feature of each object. More specifically, CNN 109B receives input sequence 111B of tracklets and outputs to fully connected layer 112B to generate an 800-dimensional feature map (e.g., a feature map 114B) of each object (and that can be sent to 119B).

Generally, motion features represented by 4 bounding boxes coordinates (x, y, w, h), as well as their corresponding velocities (x h), are concatenated to the 800-dimensional feature map of each object to obtain a fusion feature for the object represented by a 808-dimensional vector.

Method 200 includes concatenating bounding boxes coordinates and corresponding velocities to each first feature map into a corresponding first dimensional vector (203). For example, an 800-dimensional feature map of each object output at fully connected layer 112A (e.g., 114A) is concatenated with motion features represented by 4 bounding boxes coordinates from a corresponding tracklet in input sequence 111A and their corresponding velocities (e.g., 116A). Per object, the concatenation (e.g., occurring at 119A) obtains a fusion feature represented by an 808-dimensional vector (e.g., 117A) for each object output at fully connected layer 112A.

Method 200 includes concatenating bounding boxes coordinates and corresponding velocities to each second feature map into a corresponding second dimensional vector (204). For example, an 800-dimensional feature map of each object output at fully connected layer 112B (e.g., 114B) is concatenated with motion features represented by 4 bounding boxes coordinates from a corresponding tracklet in input sequence 111B and their corresponding velocities (e.g., 116B). Per object, the concatenation (e.g., occurring at 119B) obtains a fusion feature represented by an 808-dimensional vector (e.g., 117B) for each object output at fully connected layer 112B.

Generally, concatenating bounding boxes and corresponding velocities, LSTM layers are utilized to incorporate temporal dependencies of the tracking module in the 808-dimensional vectors.

Method 200 includes incorporating temporal dependencies into corresponding first dimensional vectors (205). For example, per object, LSTM 103A can incorporate temporal dependencies into the 808-dimensional vector (e.g., 117A) concatenated from the output of fully connect layer 112A and bounding boxes coordinates and velocities of corresponding tracklets in input sequence 111A. LSTM 103A outputs an 808-dimensional vector (e.g., 121A) with temporal dependencies at fully connected layer 116A.

Method 200 includes incorporating temporal dependencies into corresponding first dimensional vectors (206). For example, per object, LSTM 103B can incorporate temporal dependencies into the 808-dimensional vector (e.g., 117B) concatenated from the output of fully connect layer 112B and bounding boxes coordinates and velocities of corresponding tracklets in input sequence 111B. LSTM 103B outputs an 808-dimensional vector (e.g., 121B) with temporal dependencies at fully connected layer 116B.

Generally, the two streams of feature features flow through another fully connected layer into a softmax layer. The softmax layer identifies whether features belong to a same identity or not. Mean Squared Error (MSE) can be used for model training.

A softmax layer can implement a softmax function. A softmax function, or normalized exponential function, is a generalization of the logistic function that "squashes" a K-dimensional vector z of arbitrary real values to a K-dimensional vector σ(z) of real values, where each entry is in the range (0, 1), and all the entries adds up to 1. The function is given by:

$$\sigma: \mathbb{R}^K \to \left\{ z \in \mathbb{R}^K \mid z_i > 0, \sum_{i=1}^{K} z_i = 1 \right\}$$

$$\sigma(z)_j = \frac{e^{z_j}}{\sum_{k=1}^{K} e^{z_k}} \text{ for } j = 1, \ldots, K.$$

A softmax function can be used as a final layer of a neural network-based classifier. Such networks can be trained under a log loss (or cross-entropy) regime, giving a non-linear variant of multinomial logistic regression. Since the function maps a vector and a specific index i to a real value, the derivative can take the index into account:

$$\frac{\partial}{\partial q_k} \sigma(q, i) = \ldots = \sigma(q, i)(\delta_{ik} - \sigma(q, k))$$

Softmax normalization is a way of reducing the influence of extreme values or outliers in a dataset without removing them from the dataset. Softmax normalization mitigates impact of outlier data included in the dataset, while preserving the significance of data within a standard deviation of the mean.

Method 200 includes determining if features in first dimensional vectors and second dimensional vectors belong to the same identity (207). For example, a stream of 808-dimensional vectors (e.g., 121A) can flow from fully connected layer 116A through fully connected layer 104 to softmax layer 106. Similarly, a stream of 808-dimensional vectors (e.g., 121B) can flow from fully connected layer 116B through fully connected layer 104 to softmax layer 106. Softmax layer 106 determines whether features in an 808-dimensional vector from fully connected layer 116A (e.g., 121A) and features in an 808-dimensional vector from fully connected layer 116B (e.g., 121B) belong to the same identity. Per object, output 107 indicates same entity (e.g., 1) or not same entity (e.g., 0).

Short tracklets can be provided as input to each of CNN 102A and CNN 102B to learn long-term features of using LSTM and computing the affinity of two trajectories. Two separate algorithms can be used for initialization, (1) Kalman filter along with a Hungarian method (similar to SORT) and (2) Lucas-Kanade (LK) Optical Flow algorithm along with IOU distance computation.

Equation (1) represents a motion model where x,y are bounding box coordinates of center point, and w, h are the weight and height of the bounding box. The object location in next frame is predicted via Kalman filter. The assignment cost matrix with the intersection-over-union (IOU) distance is computed. The assignment is solved using the Hungarian algorithm. When a detection is associated to a target, the target state is updated using the detected bounding box. A relatively high threshold value $IOU_{min}$ can be set in order to obtain short but reliable tracklet.

$$X=[x,y,w,h,\dot{x},\dot{y},\dot{w},\dot{h}]^T \qquad (1)$$

To distinguish a feature learning process of motion, another initialization approach using LK Optical Flow algorithm is used to obtain input tracklets. Using the previous and the current image frames $I^{t-1}$, $I^t$, sparse local optical flow information $V_{(x,y)}^{(t-1,t)}$ can be derived, and the propagated position $\hat{d}_i^t$ of point i in the frame t is indicated in equation (2).

$$\hat{d}_i^t = V^{t-1,t}(d_i^{t-1}) = d_i^{t-1} + v_i^{t-1,t} \qquad (2)$$

where $v_i^{t-1,t}$ is the local displacement for $d_i^{t-1}$. The affine transformation matrix of inner points of the bounding box is computed with optical flow information $V_{(x,y)}^{(t-1,t)}$. The prediction location is then obtained by fitting the previous bounding box coordinated into the affine transformation. A similar assignment strategy, which computes cost matrix using IOU distance and makes an assignment using Hungarian algorithm, can be used.

Figure 3:
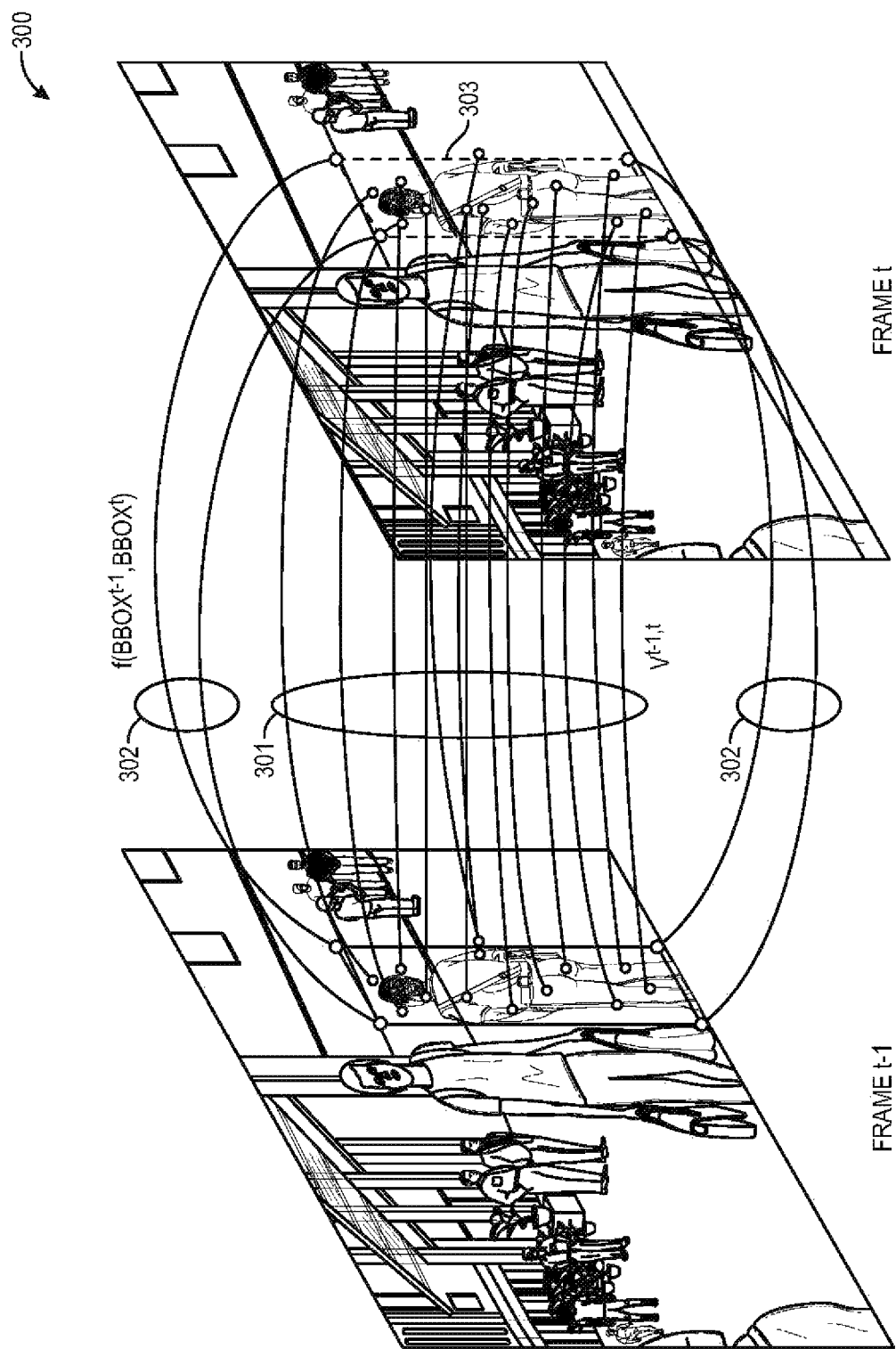
FIG. 3 illustrates a visual tracking approach using optical flow.

FIG. 3 illustrates a visual tracking approach using optical flow. Lines 301 lines are optical flow information (and connect between points inside the solid box in frame t−1 and points inside the dashed box in frame t), lines 302 are affine transformation (and connect between the corners of the solid box in frame t−1 and the corners of the dashed box in frame t), and dashed box at frame t is predicted location 303.

As described, numbers of short yet reliable tracklets in time order can be obtained during initialization. The obtained tracklets can be used as inputs to the pre-trained LSTM network for affinity computation. More specifically, for each tracklet $A^i\{t+1, t+2, \ldots, t+l\}$ a window of frames with length l from the end of tracklet is input into one stream of the Siamese network (e.g., 101A) as an anchor. For those tracklets whose first frames are within $\{t+l+1, t+l+2, \ldots, t+l+\alpha\}$, the same length l of frames from the beginning of tracklets is taken and input them into another stream of the Siamese network (e.g., 101B) as candidates.

The parameter a indicates the time gap. If the interval of two tracklets are longer than a, the two targets are considered unrelated. Output from the Siamese LSTM network (pre-trained on the training dataset) is then taken into a forward propagation to obtain the similarity scores of the anchor and all its candidates. The output 107 of LSTM network is a single value between 0 and 1 which indicates the affinity of two tracklets.

A threshold value $S_{min}$ can be set to filter out the candidates with low confidence. If the output is lower than $S_{min}$, the target is taken as different identity with the anchor and removed from the candidates. For those candidates with similarity scores higher than $S_{min}$, if there exist time overlaps, the tracklets ahead in time are used and others removed from the candidates. Similarity scores can be computed for anchors with their corresponding candidates at onetime step. After calculating similarity scores, the Hungarian algorithm is used to solve the global problem for our data association and thus obtain the longer tracklets. Candidates assigned to the anchors are marked as matched pairs. Other candidates not assigned to anchors are considered unmatched pairs.

A unified network trained offline could not be easily adapted to real scenario as each object has a separate motion pattern. Thus, an online updating approach is used to retrain the LSTM for each tracklet frame-by-frame. That is, when assigning a tracklet to an existing one, the LSTM model is again trained to update the metric by adding new feature vectors of appearance, motion and velocity.

More specifically, new LSTM models can be initialized for targets. When the process of data association at one time step is accomplished, training samples can be acquired from matched pairs with label 1 and from unmatched pairs with label 0. Acquired training samples are fed into the Siamese networks for training. Thus, the updated feature representation is obtained for each target. In general, each trajectory is initialized with a pre-trained model and each model is updated when an assignment occurs. The data association and model updating occurs interactively within a time step. In this way, feature representations of trajectories can be more accurate and update-to-date.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media. Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A computer system comprising:
a processor; and
system memory coupled to the processor and storing instructions configured to cause the processor to:
implement a pre-trained pair of neural networks including a first neural network and a second neural network,
the first neural network including a first re-id network and a first Long Short-Term Memory (LSTM) layer,
wherein the first re-id network is configured to receive the first sequence of tracklets and generate a first feature map for each object in the first sequence of tracklets;
wherein the first neural network is configured to concatenate bounding box center point coordinates, bounding box weights, and bounding box heights, and corresponding bounding box center point coordinate velocities, corresponding bounding box weight velocities, and corresponding bounding box height velocities associated with the first sequence of tracklets to each first feature map into first dimensional vectors; and wherein the first LSTM layer is configured to incorporate temporal dependencies into the first dimensional vectors; and the second neural network including a second re-id network and a second Long Short-Term Memory (LSTM) layer, wherein the second re-id network is configured to receive a second sequence of tracklets and generate a second feature map for each object in the second sequence of tracklets;

wherein the second neural network is configured to concatenate bounding box center point coordinates, bounding box weights, and bounding box heights, and corresponding bounding box center point coordinate velocities, corresponding bounding box weight velocities, and corresponding bounding box height velocities associated with the second sequence of tracklets to each second feature map into second dimensional vectors; and wherein the second LSTM layer is configured to incorporate temporal dependencies into the second dimensional vectors;

implement a softmax layer configured to determine a similarity score indicative of similarity between a first identity represented in the first dimensional vectors and a second identity represented in the second dimensional vectors; and output an indication if the first identity and the second identity are the same identity in view of the similarity score.

2. The computer system of claim 1, wherein the pretrained pair of neural networks comprises a Siamese Long Short-Term Memory network.

3. The computer system of claim 1, further comprising a tracklet acquisition module configured to use Lucas-Kanade Optical Flow algorithm to obtain the first sequence of tracklets.

4. The computer system of claim 3, wherein the tracklet acquisition module is further configured to use affine transformation to predict object movement between image frames.

5. The computer system of claim 1, wherein the first neural network and the second neural network each include a convolutional neural network having multiple respective convolution layers and a fully connected layer.

6. The computer system of claim 5, wherein the first neural network and the second neural network have the same configuration with the same parameters and weights.

7. A method, comprising:
receiving a first sequence of tracklets;
generating a first feature map for each object in the first sequence of tracklets;
concatenating bounding box center point coordinates, bounding box weights, and bounding box heights, and corresponding bounding box center point coordinate velocities, corresponding bounding box weight velocities, and corresponding bounding box height velocities associated with the first sequence of tracklets to each first feature map into first dimensional vectors;
fusing temporal dependencies into the first dimensional vectors;
receiving a second sequence of tracklets;
generating a second feature map for each object in the second sequence of tracklets;
concatenating bounding box center point coordinates, bounding box weights, and bounding box heights, and corresponding bounding box center point coordinate velocities, corresponding bounding box weight velocities, and corresponding bounding box height velocities associated with the first sequence of tracklets to each second feature map into second dimensional vectors;
fusing temporal dependencies into the second dimensional vectors; and
determining a similarity score indicative of similarity between a first identity represented in the first dimensional vectors and a second identity represented in the second dimensional; and
outputting an indication if the first identity and the second identity are the same identity in view of the similarity score.

8. The method of claim 7, further comprising using a Lucas-Kanade Optical Flow algorithm to obtain the first sequence of tracklets.

9. The method of claim 8, further comprising using affine transformation to predict object movement between image frames.

* * * * *